(12) United States Patent
Adrian et al.

(10) Patent No.: US 7,654,495 B2
(45) Date of Patent: Feb. 2, 2010

(54) HANGER ASSEMBLY

(75) Inventors: John R. Adrian, Oshkosh, WI (US);
Richard G. McDonald, Plymouth, WI (US); Robert G. Penlesky, Waukesha, WI (US); Kenneth J. Jonas, Mequon, WI (US); Daniel L. Karst, Beaver Dam, WI (US)

(73) Assignee: Broan-Nutone LLC, Hartford, WI (US)

( * ) Notice: Subject to any disclaimer, the term of this patent is extended or adjusted under 35 U.S.C. 154(b) by 477 days.

(21) Appl. No.: 11/330,041

(22) Filed: Jan. 11, 2006

(65) Prior Publication Data

US 2008/0011928 A1 Jan. 17, 2008

(51) Int. Cl.
*E04G 25/00* (2006.01)
(52) U.S. Cl. .................. 248/200.1; 248/342; 248/906
(58) Field of Classification Search .................. 248/342, 248/343, 323, 200.1, 906
See application file for complete search history.

(56) References Cited

U.S. PATENT DOCUMENTS

| | | | |
|---|---|---|---|
| 4,336,575 A * | 6/1982 | Gilman | 362/147 |
| 4,723,747 A | 2/1988 | Karp et al. | |
| 4,803,603 A | 2/1989 | Carson | |
| 4,967,990 A | 11/1990 | Rinderer | |
| 4,972,339 A | 11/1990 | Gabrius | |
| 5,029,794 A | 7/1991 | Wolfe | |
| 5,222,800 A | 6/1993 | Chan et al. | |
| 5,355,604 A * | 10/1994 | Rathke | 40/601 |
| 5,505,419 A | 4/1996 | Gabrius | |
| 5,588,737 A | 12/1996 | Kusmer | |
| 5,662,414 A | 9/1997 | Jennings et al. | |
| 5,678,799 A | 10/1997 | Jorgensen et al. | |
| 5,690,423 A | 11/1997 | Hentz et al. | |
| 5,758,959 A | 6/1998 | Sieczkowski | |
| 5,857,766 A | 1/1999 | Sieczkowski | |
| 5,934,631 A | 8/1999 | Becker et al. | |
| 5,954,304 A | 9/1999 | Jorgensen | |
| 5,957,573 A | 9/1999 | Wedekind et al. | |
| 5,957,574 A | 9/1999 | Hentz et al. | |
| 6,004,011 A | 12/1999 | Sieczkowski | |
| 6,033,098 A | 3/2000 | Hentz et al. | |
| 6,076,788 A | 6/2000 | Akiyama | |
| 6,123,438 A | 9/2000 | Hentz | |
| 6,176,599 B1 | 1/2001 | Farzen | |
| 6,364,511 B1 | 4/2002 | Cohen | |
| 6,632,006 B1 * | 10/2003 | Rippel et al. | 362/366 |

(Continued)

*Primary Examiner*—J. Allen Shriver, II
*Assistant Examiner*—Steven M Marsh
(74) *Attorney, Agent, or Firm*—Michael Best & Friedrich LLP

(57) ABSTRACT

A hanger assembly configured to mount a fan housing in a building including a first support having a lower surface and a second support. The hanger includes a body having a first end engageable with the first support and a second end engageable with the second support. The body is connectable to the fan housing to support the fan housing between the first and second supports and is adjustable to change a length defined between the first and second ends. The first end includes an outwardly extending flange, which is engageable with the first support to orient the body and the fan housing relative to the lower surface of the first support and to maintain a predetermined distance between the lower surface of the support and a lower surface of one of the fan housing and the hanger body.

15 Claims, 7 Drawing Sheets

U.S. PATENT DOCUMENTS 6,761,341 B2    7/2004  Pfaller
6,838,618 B2 *  1/2005  Newbold et al. .............. 174/50

2004/0040231 A1    3/2004  Tseng

* cited by examiner

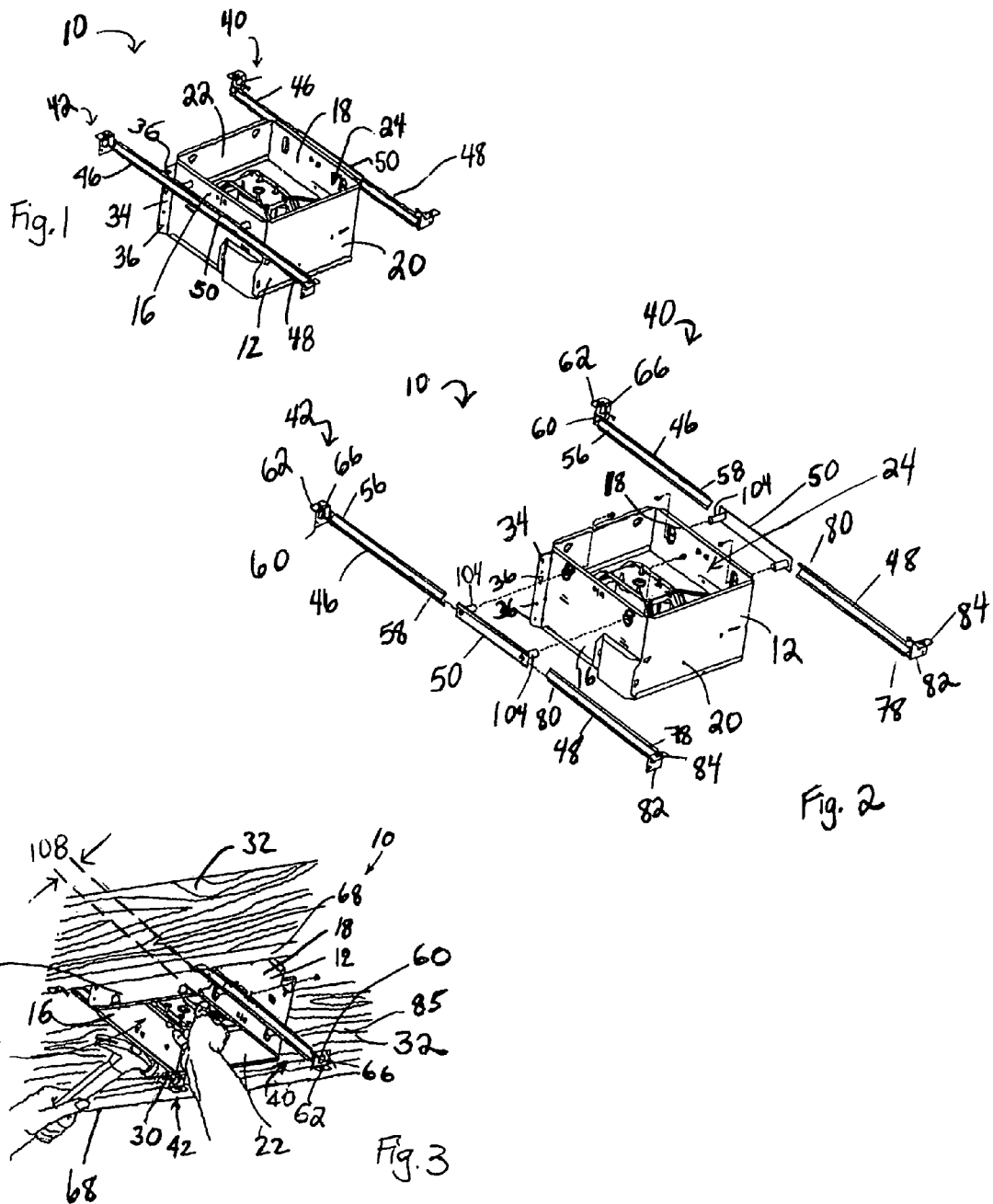

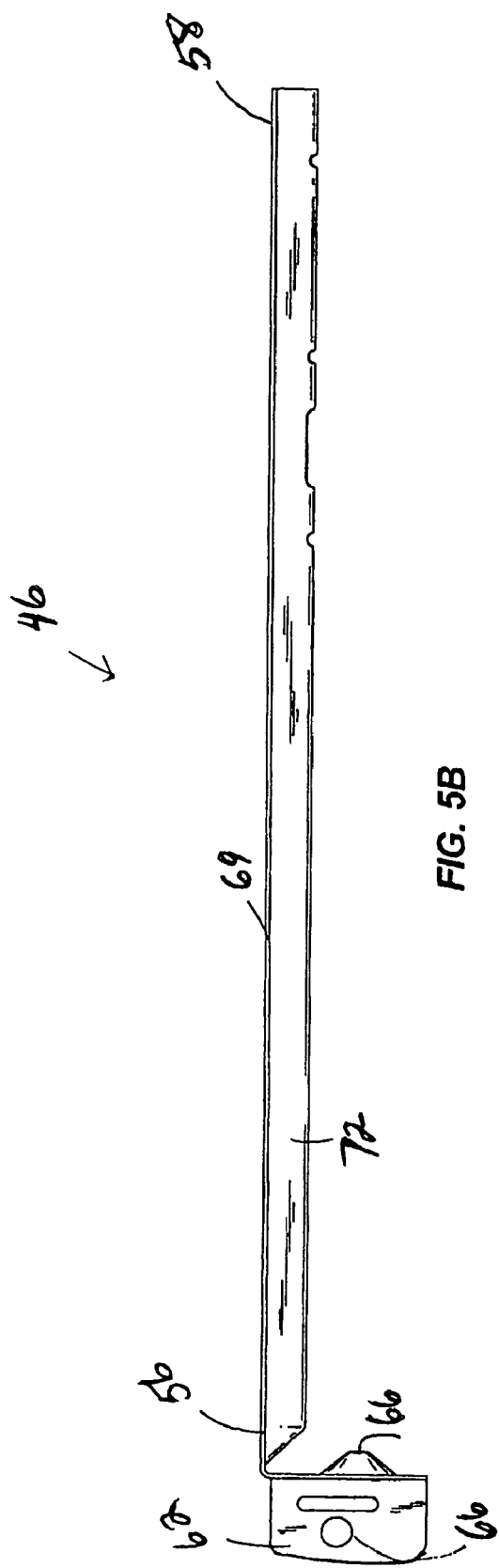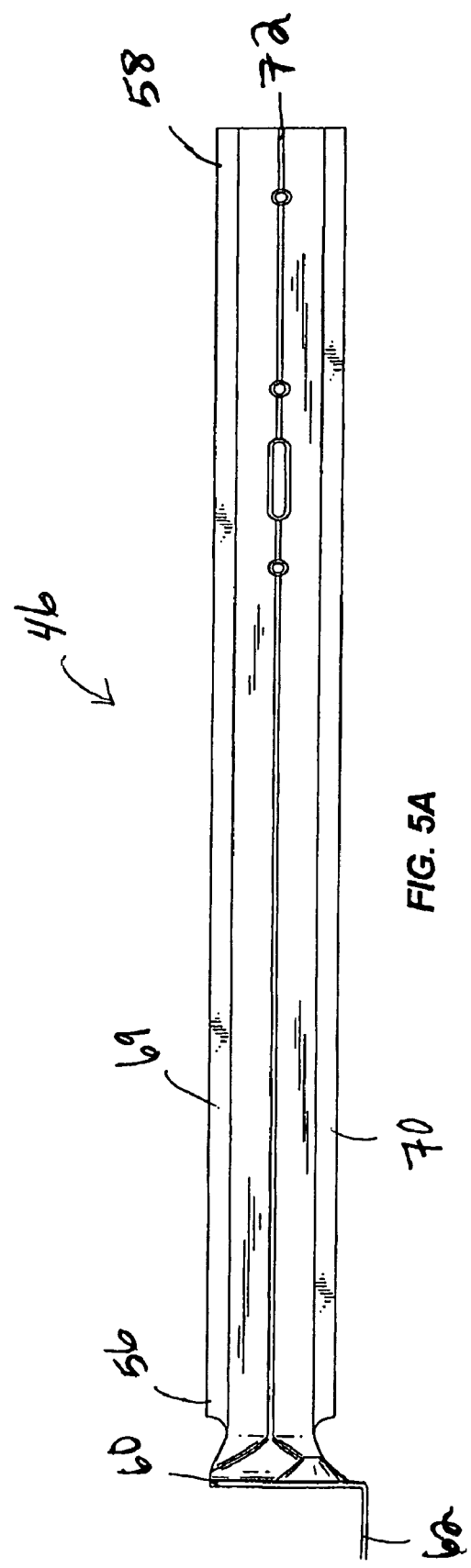

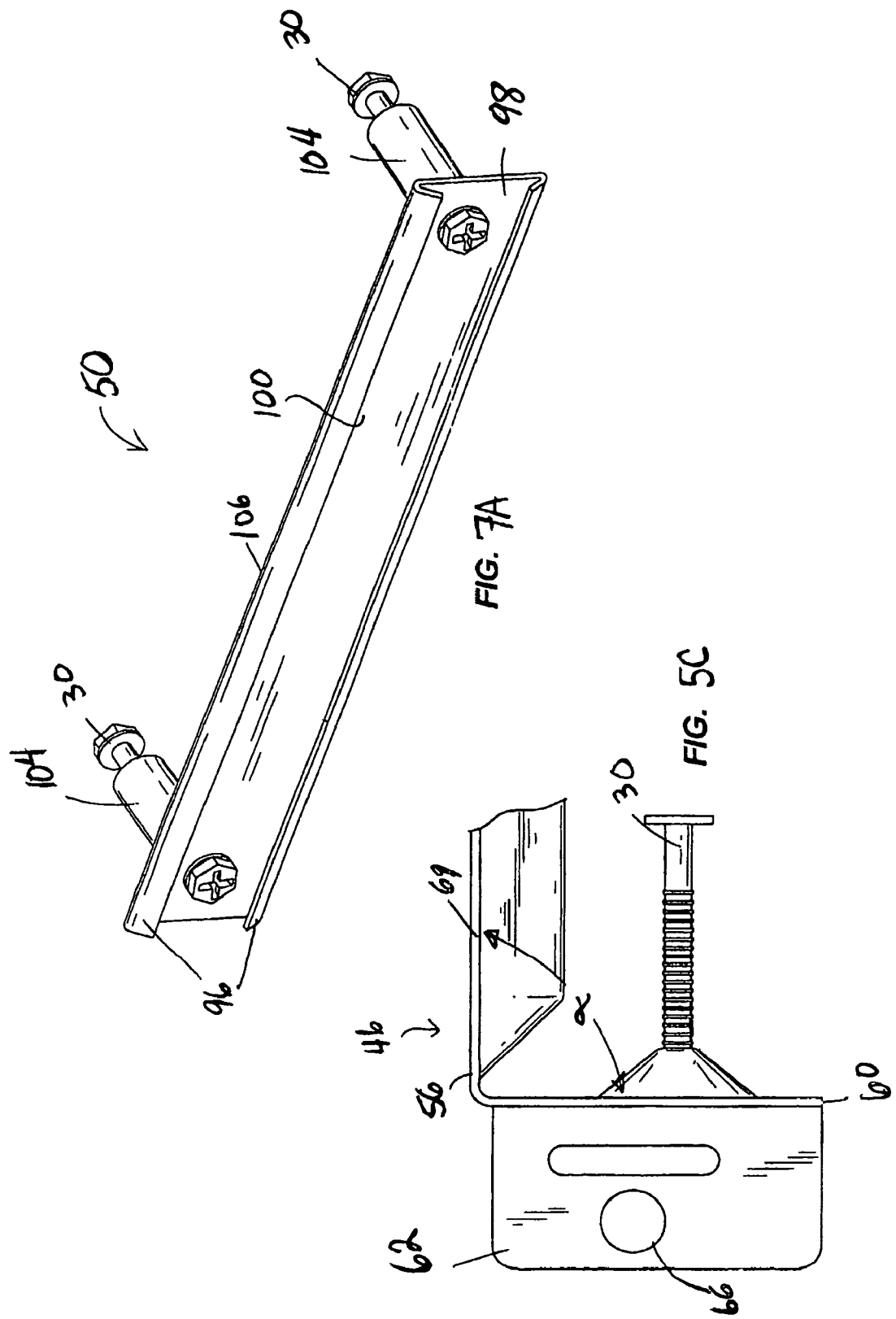

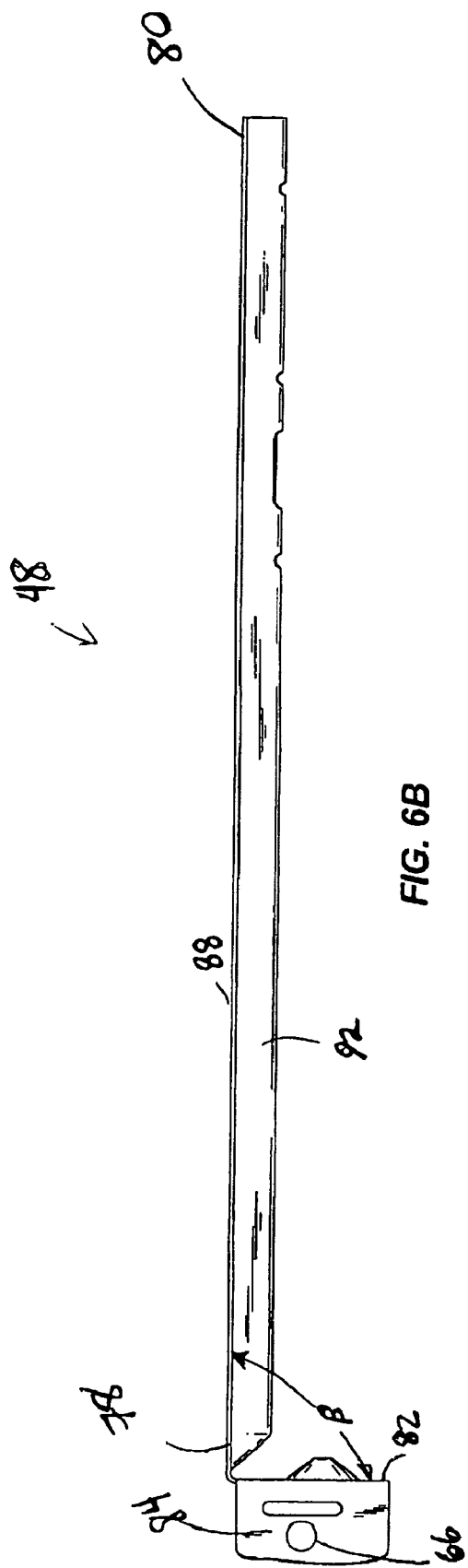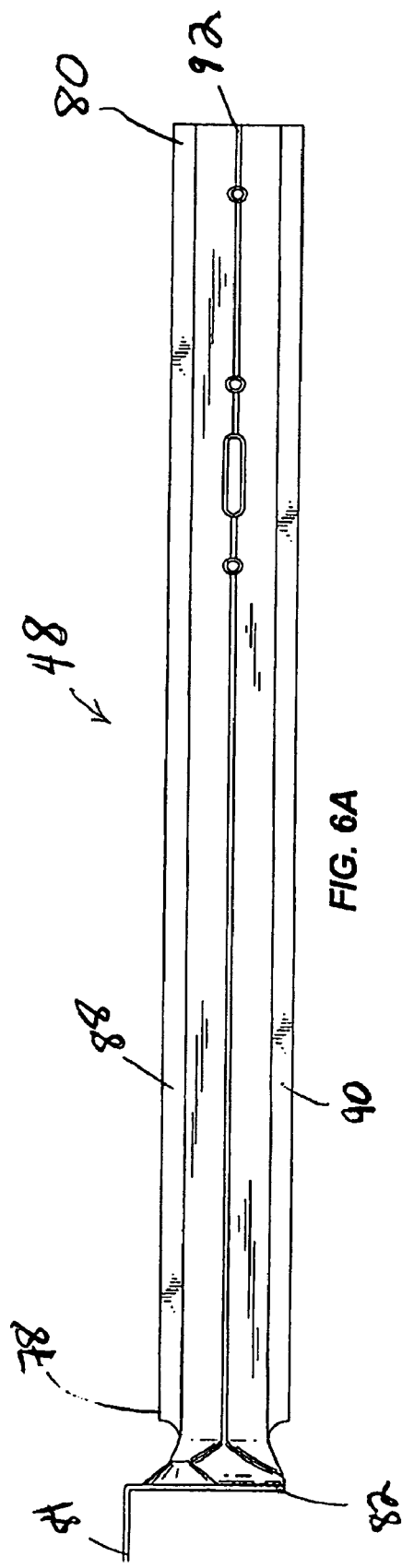

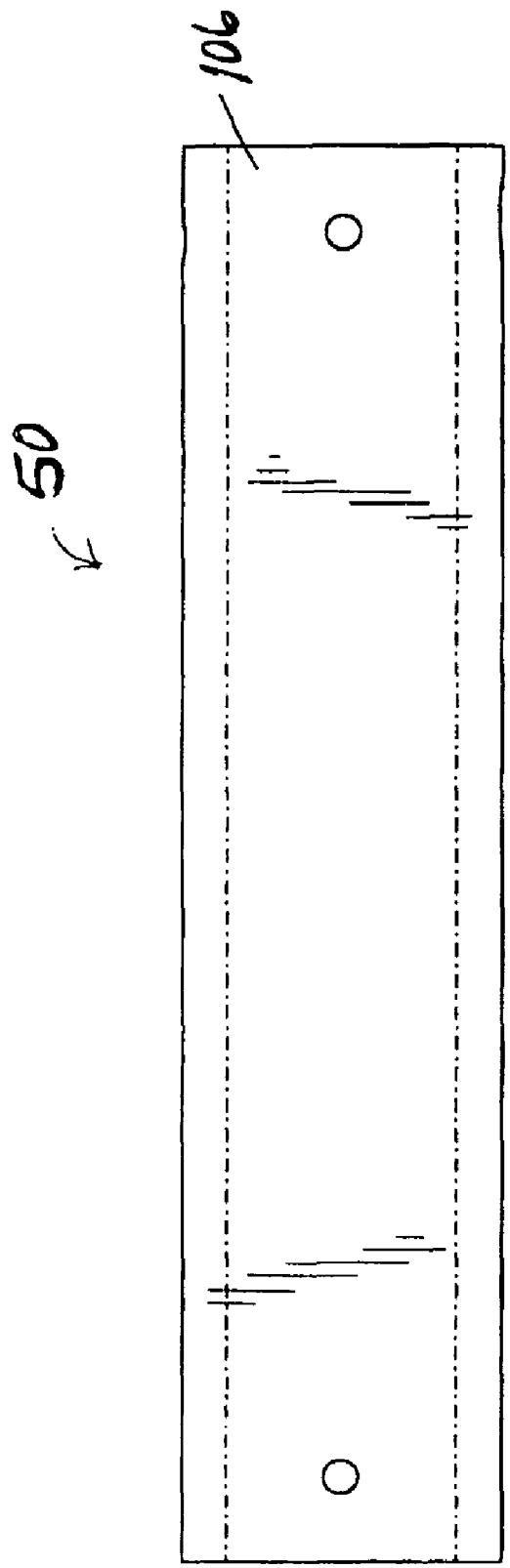
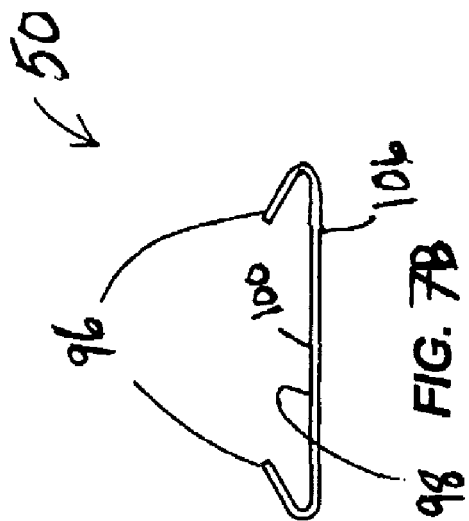
FIG. 8
FIG. 7B

US 7,654,495 B2

HANGER ASSEMBLY

FIELD OF THE INVENTION

The present invention relates to hanger assemblies and, more particularly, to a hanger assembly for mounting a fan housing in a building.

SUMMARY

Some embodiments of the invention provide a hanger assembly configured to mount a fan housing in a building including a first support having a lower surface and a second support. In some embodiments, the hanger assembly includes a body having a first end engageable with the first support and a second end engageable with the second support, the body being connectable to the fan housing to support the fan housing between the first support and the second support and being adjustable to change a length defined between the first end and the second end. In these embodiments, the first end can include an outwardly extending flange, which is engageable with the first support to orient the body and the fan housing relative to the lower surface of the first support and to maintain a predetermined distance between the lower surface of the first support and a lower surface of one of the fan housing and the hanger body.

In addition, the invention provides a hanger assembly configured to mount a fan housing to a support in a building, the support having a first surface and a second surface substantially normal to the first surface. In these embodiments, the hanger assembly can include a body connectable to the fan housing and having a first flange and a second flange, the first flange being engageable with the first surface of the support and the second flange being engageable with the second surface of the support to secure the hanger body and the fan housing to the support.

The invention also provides a method of mounting a fan housing to a support in a building, the support having a side surface and a lower surface substantially normal to the side surface. Some embodiments include the acts of providing a hanger assembly including a body having an end, the end having a first outwardly extending flange and a second outwardly extending flange, securing the fan housing to the hanger body, connecting the first flange to the side surface of the support to secure the hanger body and the fan housing to the support, and connecting the second flange to the second surface of the support to orient the hanger body and the fan housing relative to the lower surface of the first support and to maintain a predetermined distance between a lower surface of the fan housing and the lower surface of the support.

Other aspects of the invention will become apparent by consideration of the detailed description and accompanying drawings.

BRIEF DESCRIPTION OF THE DRAWINGS

FIG. 1 is a top perspective view of a fan housing and a hanger assembly according to some embodiments of the present invention.

FIG. 2 is an exploded perspective view of the fan housing and the hanger assembly shown in FIG. 1.

FIG. 3 is bottom perspective view of the fan housing and hanger assembly shown in FIG. 1.

FIG. 5A is a side view of a first mounting bracket of the hanger assembly shown in FIG. 1.

FIG. 5B is a top view of the first mounting bracket shown in FIG. 5A.

FIG. 5C is a side view of a portion of the second mounting bracket shown in FIG. 5A.

FIG. 6A is side view of a second mounting bracket of the hanger assembly shown in FIG. 1.

FIG. 6B is a top view of the second mounting bracket of the hanger assembly shown in FIG. 6A.

FIG. 7A is a perspective view of a third mounting bracket of the hanger assembly shown in FIG. 1.

FIG. 7B is an end view of the third mounting bracket shown in FIG. 7A.

FIG. 8 is a side view of the mounting bracket shown in FIG. 7A.

DETAILED DESCRIPTION

Figure 4:
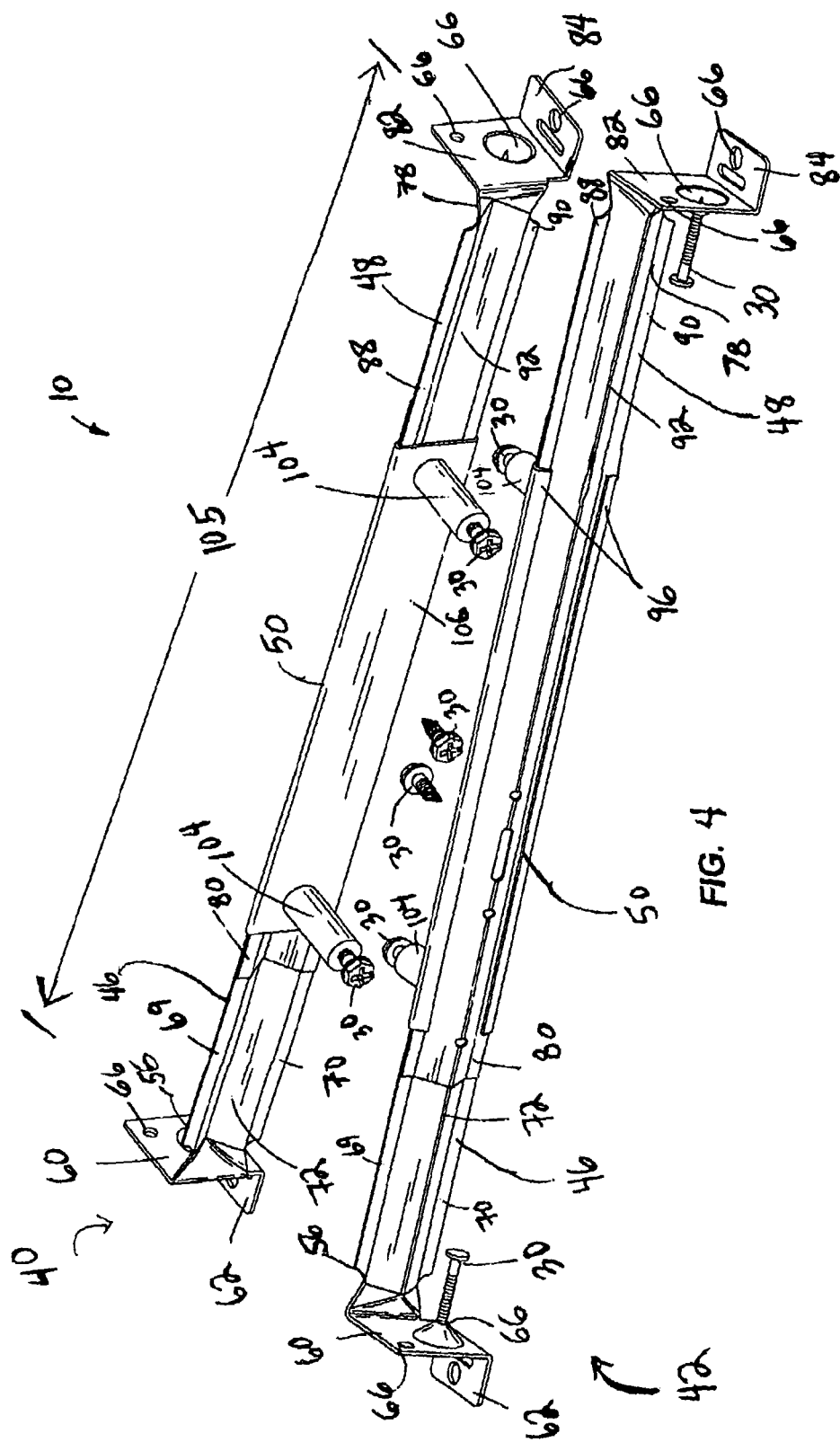
FIG. 4 is an enlarged perspective view of the hanger assembly shown in FIG. 1.
Figure 9A:
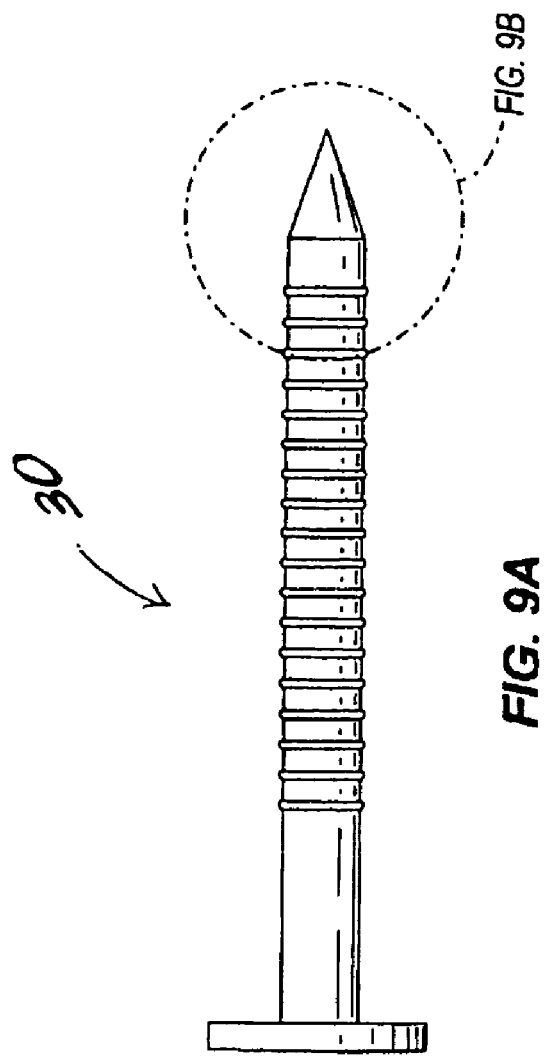
FIG. 9A is side view of a fastener shown in FIG. 1.
Figure 9B:
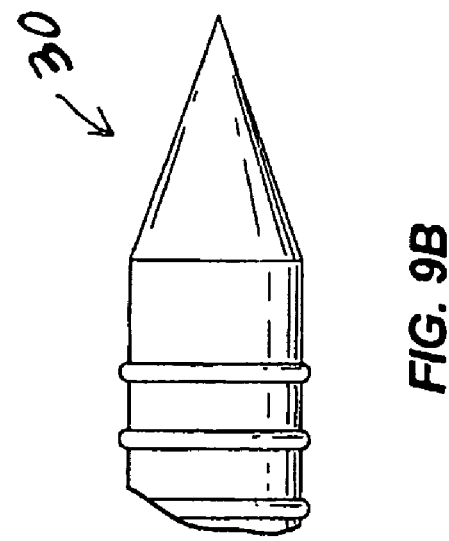
FIG. 9B is an enlarged side view of a portion of the fastener shown in FIG. 9A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first", "second," and "third" are used herein for purposes of description and are not intended to indicate or imply relative importance or significance.

FIGS. 1-9B illustrate a hanger assembly 10 and a portion of a fan housing 12 according to some embodiments of the present invention. The hanger assembly 10 can be installed or used with any structure capable of ventilation, such as, for example, a home, a commercial building, and the like.

The fan housing 12 can have any shape desired, such as a round shape, a rectangular, triangular, or other polygonal shape, an irregular shape, and the like. By way of example only, the fan housing 12 of the illustrated embodiment has a generally rectangular shape, and has sidewalls 16, 18, a front wall 20, and a back wall 22. Together, the front wall 20, sidewalls 16, 18, and back wall 22 at least partially define an interior space 24 for a fan, a fan motor, and/or other elements of a building ventilation system (e.g., electrical conduits, heating elements, filters, and the like). In addition, in some embodiments, the fan housing 12 can have a relatively small profile so that the fan housing 12 can be installed or located in relatively confined areas.

The fan housing 12 can be mounted in any orientation, such as in a vertical orientation installed in a wall, a horizontal orientation installed in a ceiling, or in any other orientation desired. The fan housing 12 can be secured within a wall, ceiling, or other building structure in a partially or fully recessed position. In such cases, the fan housing 12 can be received within an aperture or recessed portion of the wall, ceiling, or other building structure. Alternatively, the fan housing 12 can be secured to a building structure in a non-recessed position.

In other embodiments, the fan housing 12 can be partially supported within an aperture of a wall, ceiling, or other building structure and can extend outwardly a predetermined distance from the wall, ceiling, or other building structure. In these embodiments, a grill or face plate can be secured to an exterior side of the fan housing 12.

In order to secure the fan housing 12 with respect to a wall, ceiling, or other building structure as described above, the fan housing 12 can include outwardly extending mounting flanges 34, and fasteners 30 (e.g., pins, screws, nails and other conventional fasteners, magnets, and clips) can be inserted through attachment holes 36 in the mounting flanges 34 for securing the fan housing 12 to a structural support 32 of the building structure. Alternatively and as described in greater detail below, the fasteners 30 can connect any part of the fan housing 12, such as, for example, the side walls 16, 18, the back wall 22, or the front wall 24, to the hanger assembly 10 and can extend through attachment holes 36 in the fan housing 12 for this purpose. As used herein and in the appended claims, the term "structural support" includes any building structural element to which a fan or ventilation system can be mounted, and includes without limitation joists, sub-joists, studs, I-beams or beams having other shapes, struts, rafters, headers, girders, trusses, and the like.

The fan housing 12 of the illustrated embodiment of FIGS. 1-3 is oriented substantially vertically, with the front wall 20 substantially normal to a structural support 32. In alternate embodiments, the fan housing 12 can have other orientations with respect to the building structure and its structural support(s) 32, typically determined at least in part by space constraints, the orientation of the structural support(s) 32, the spacing between structural supports 32, and/or whether the fan housing 12 is mounted in a wall or in a ceiling.

As shown in FIGS. 1-4, the hanger assembly 10 can include a first mounting arrangement 40 and a second mounting arrangement 42 for connecting the fan housing 12 to a building structural support 32 and/or for supporting the fan housing 12 between two or more structural supports 32. More particularly, in some embodiments, such as the illustrated embodiment of FIGS. 1-4, opposite ends of a first mounting arrangement 40 can be secured to two adjacent supports 32, opposite ends of a second mounting arrangement 42 can be secured to the same or other supports 32, and a fan housing 12 can be supported between the first and second mounting arrangements 40, 42 and between the supports 32. In other embodiments, a single mounting arrangement 40 may be used to support the fan housing 12 in a building.

As shown in FIGS. 1-9B, each of the first and second mounting arrangements 40, 42 can include a first mounting bracket 46, a second mounting bracket 48, and a third mounting bracket or slide 50. Each of the first mounting bracket 46, the second mounting bracket 48, and the third mounting bracket 50 of the first and second mounting arrangements 40, 42 can be manufactured from sheet-metal, steel, other metals, ceramics, composite materials, plastic, and the like. Because the first and second mounting arrangements 40, 42 and their respective first, second, and third brackets 46, 48, 50 are substantially similar, the following description refers only to the first mounting arrangement 40. However, it should be understood that the second mounting arrangement 42 is substantially similar and is not described in detail hereafter only for reasons of clarity and brevity.

The first mounting bracket 46 includes an outer end 56 and an inner end 58. The outer end 56 includes a first outwardly extending flange 60 and a second outwardly extending flange 62. The first flange 60 extends outwardly from the outer end 56 of the first mounting bracket 46 and is oriented at an angle $\alpha$ (shown in FIG. 5C) of between about 80 degrees and about 100 degrees with respect to the first mounting bracket 46. In other embodiments, the first flange 60 can be oriented at other angles $\alpha$ with respect to the outer end 56 of the first mounting bracket 46, such as, for example, between about 120 degrees and about 100 degrees, between about 60 degrees and about 80 degrees, or between about 40 degrees and about 60 degrees. In still other embodiments, the first flange 60 can be substantially co-planar with the outer end 56 of the first mounting bracket 46.

Fasteners 30 can be inserted through apertures 66 in the first flange 60 to connect the first mounting bracket 46 to a side surface of a structural support 32. In some embodiments, such as the illustrated embodiment of FIGS. 1-5C, the first flange 60 can include two or more apertures 66 to provide multiple mounting locations.

Alternatively or in addition, in some embodiments, such as the illustrated embodiment of FIGS. 1-5C, fasteners 30 can be mounted on the first flange 60 and can be maintained in a first or retracted position, in which an outer end or tip of the fastener 30 is retracted or substantially retracted with respect to an outer surface of the first flange 60. In these embodiments, a retainer, such as, for example, a washer a clip, and the like, can be used to mount the fastener 30 on the first flange 60 and to maintain the fastener 30 in the retracted position. In other embodiments, the fastener 30 can include outwardly extending threads, ribs, or other protrusions for frictionally engaging the first flange 60 to maintain the fastener 30 in the retracted position. As explained below in greater detail, after positioning the hanger assembly 10 in a structure and after positioning the first flange 60 adjacent to a support 32, an operator can move the fastener 30 from the retracted position toward an extended position, in which the fastener 30 engages the support 32 to secure the first mounting bracket 46 to the structural support 32.

In the illustrated embodiment of FIGS. 1-5C, the second flange 62 extends outwardly from the first flange 60 and is oriented in a plane which is substantially normal to the first flange 60 and substantially normal to the body of the first mounting bracket 46. Fasteners 30 can also or alternately be inserted through apertures 66 in the second flange 62 to connect the second mounting bracket 46 to a lower surface 68 of a structural support 32. In some embodiments, such as the illustrated embodiment of FIGS. 1-5C, the second flange 62 can include two or more apertures 66 to provide multiple mounting locations.

In some embodiments, fasteners 30 can be mounted on the second flange 62 and can be maintained in a first or retracted position, in which an outer end or tip of the fastener 30 is retracted or substantially retracted with respect to an outer surface of the second flange 62.

As shown in FIGS. 4-5C, the first mounting bracket 46 can have a substantially C-shaped cross-section and can include an upwardly extending lip or rail 69, a downwardly extending lip or rail 70, and a central rib 72 extending along the first mounting bracket 46 between the outer and inner ends 56, 58. In other embodiments, the first mounting bracket 46 can take a number of different forms and can have a number of different cross-sectional shapes, including without limitation a D-shaped cross-sectional shape, a square cross-sectional shape, a triangular cross-sectional shape, a strip having a dimpled, ribbed, or other varying cross-sectional shape, and the like. Alternatively or in addition, the first mounting bracket 46 can have one, three, or more outwardly extending rails 69 located on the upper, lower, side, rear, or front surfaces of the first mounting bracket 46.

In some embodiments, such as the illustrated embodiment of FIGS. 1-9B, the second mounting bracket 48 can have a substantially similar shape to the first mounting bracket 46. As shown in FIGS. 4, 6A, and 6B, the second mounting bracket 48 includes an outer end 78 and an inner end 80. The outer end 78 includes a first outwardly extending flange 82 and a second outwardly extending flange 84. The first flange 82 extends outwardly from the outer end 78 of the second mounting bracket 48 and is oriented at an angle β of between about 80 degrees and about 100 degrees with respect to the second mounting bracket 48.

In other embodiments, the first flange 82 can be oriented at other angles β with respect to the outer end 78 of the second mounting bracket 48, such as, for example, between about 100 degrees and about 120 degrees, between about 60 degrees and about 80 degrees, or between about 40 degrees and about 60 degrees. In still other embodiments, the first flange 82 can be substantially co-planar with the outer end 78 of the second mounting bracket 48.

The second flange 84 extends outwardly from the first flange 82 and is oriented in a plane which is substantially normal to the first flange 82 and substantially normal to the body of the second mounting bracket 48.

Fasteners 30 can be inserted through apertures 66 in the first flange 82 to connect the second mounting bracket 48 to a side surface 85 of a structural support 32 and/or through apertures 66 in the second flange 84 to connect the second mounting bracket 48 to a lower surface 68 of the structural support 32. In some embodiments, such as the illustrated embodiment of FIGS. 4, 6A, and 6B, the first flange 82 and/or the second flange 84 can include two or more apertures 66 to provide multiple mounting locations.

In some embodiments, such as the illustrated embodiment of FIGS. 4, 6A, and 6B, fasteners 30 can be mounted on the first flange 80 and the second flange 82 and can be maintained in a first or retracted position, in which an outer end or tip of the fastener 30 is retracted or substantially retracted with respect to outer surfaces of the first flange 80 and the second flange 82, respectively. In these embodiments, a retainer, such as, for example, a washer a clip, and the like, can be used to mount the fastener 30 on the first and second flanges 80, 82 and to maintain the fastener 30 in the retracted position. In other embodiments, the fastener 30 can include outwardly extending threads, ribs, or other protrusions for frictionally engaging the first and second flanges 80, 82 to maintain the fastener 30 in the retracted position. As explained below in greater detail, after positioning the hanger assembly 10 in a structure and after positioning the first and second flanges 82, 84 adjacent to a support 32, an operator can move the fastener (s) 30 from the retracted position toward an extended position, in which the fastener(s) 30 engages the support 32.

As shown in FIGS. 4, 6A, and 6B, the second mounting bracket 48 can have a substantially C-shaped cross-section and can include an upwardly extending lip or rail 88, a downwardly extending lip or rail 90, and a central rib 92 extending along the second mounting bracket 48 between the outer and inner ends 78, 80. In other embodiments, the second mounting bracket 48 can take a number of different forms and can have a number of different cross-sectional shapes, including without limitation a D-shaped cross-sectional shape, a square cross-sectional shape, a triangular cross-sectional shape, a strip having a dimpled, ribbed, or other varying cross-sectional shape, and the like. Alternatively or in addition, the second mounting bracket 48 can have one, three, or more outwardly extending rails 88 located on the upper, lower, side, rear, or front surfaces of the second mounting bracket 48.

As shown in FIGS. 4, 7A, 7B, and 8, the third mounting bracket 50 can have a substantially C-shaped cross-section and can include two inwardly extending tabs 96, which together define a channel 98 extending along an exterior surface 100 of the third mounting bracket 50. In other embodiments, the third mounting bracket 50 can take a number of different forms and can have a number of different cross-sectional shapes, including without limitation a D-shaped cross-sectional shape, a square cross-sectional shape, a triangular cross-sectional shape, a strip having a dimpled, ribbed, or other varying cross-sectional shape, and the like.

In some embodiments, such as the illustrated embodiment of FIGS. 4, 7A, 7B, and 8, the third mounting bracket 50 includes outwardly extending spacers 104 positioned along an interior surface 106 of the third mounting bracket 50. In other embodiments, the third mounting bracket 50 can have one, three, or more spacers 104.

As shown in FIG. 4, outer ends of the spacers 104 can be connected to one of the side walls 16, 18 of the fan housing 12 to secure the fan housing 12 to the hanger assembly 10. In other embodiments, the spacers 104 can also or alternately be connected to the front and back walls 22, 24 of the fan housing 12 to secure the fan housing 12 to the hanger assembly 10. The spacers 104 can be sized to provide clearance between other elements of the hanger assembly 10 (e.g., the first, second, and the third mounting brackets 46, 48, 50) and the mounting flanges 34 and/or other elements supported on the exterior of or extending outwardly from the fan housing 12. In this manner, the hanger assembly 10 can be used to mount a number of differently configured fan housings 12 in structures without requiring substantial modification to the hanger assembly 10 or the fan housings 12.

As shown in FIGS. 1-4, the first and second mounting brackets 46, 48 slidingly engage the third mounting bracket 50 and are movable relative to the third mounting bracket 50 to adjust a length 105 of the first mounting arrangement 40 measured between the outer end 56 of the first mounting bracket 46 and the outer end 78 of the second mounting bracket 48. More particularly, the upwardly and downwardly extending rails 60, 62 of the first mounting bracket 46 slidingly engage the inwardly extending tabs 96 of the third mounting bracket 50 to slidingly connect the first and third mounting brackets 46, 50 and the upwardly and downwardly extending rails 88, 90 of the second mounting bracket 48 slidingly engage the inwardly extending tabs 96 of the third mounting bracket 50 to slidingly connect the second and third mounting brackets 48, 50. In addition and as shown in FIGS. 1, 3, and 4, in some embodiments, the inner end 78 of the second mounting bracket 48 can be moved across and into overlapping engagement with the inner end 58 of the first mounting bracket 46 to further adjust the length 105 of the first mounting arrangement 40.

In operation, an installer inserts fasteners 30 through the exterior surface 100 of the third mounting bracket 48, through the spacers 104, and into the fan housing 12. The operator then inserts the inner end 58 of the first mounting bracket 46 into the channel 98 of the third mounting bracket 50 and slidingly engages the upwardly and downwardly extending rails 69, 70 and the inwardly extending tabs 96 of the third mounting bracket 50. Next, the installer inserts the inner end 80 of the second mounting bracket 48 into the channel 98 of the third mounting bracket 50 and slidingly engages the upwardly and downwardly extending rails 88, 90 and the inwardly extending tabs 96 of the third mounting bracket 50.

After the first mounting arrangement 40 is secured to the fan housing 12, the installer positions the first mounting arrangement 40 and the fan housing 12 in a building structure adjacent to one or more supports 32. The installer can then move the first and/or second mounting brackets 46, 48 along the channel 98 and relative to the third mounting bracket 50 to adjust the length 105 between the outer ends 56, 78 of the first and second mounting brackets 46, 48 to fit the first mounting arrangement 40 between adjacent supports 32. In alternate embodiments, an installer can assemble the first, second, and third mounting brackets 46, 48, 50 and can then secure the third mounting bracket 50 and/or the spacers 104 to the fan housing 12.

The installer can then position the first flange 60 of the first mounting bracket 46 on a side surface 85 of a support 32 and position the second flange 62 of the first mounting bracket 46 on a lower surface 68 of the support 32. The installer positions the first flange 82 of the second mounting bracket 48 on a side surface 85 of an adjacent support 32 and positions the second flange 84 of the second mounting bracket 48 on the lower surface 68 of the same support 32. In this manner, the installer can orient the first mounting arrangement 40 and the fan housing 12 in a desired orientation with respect to the lower surface 68 of the supports 32 so that at least one of the first mounting arrangement 40 and the fan housing 12 can be recessed a predetermined distance 108 (e.g., three-eighths of an inch, half an inch, seven-eighths of an inch) from the lower surface 68 of the support 32 to provide clearance for drywall, plaster, or other wall coverings or wall forming elements without requiring the installer to manually measure the distance 108 between the lower surface 68 of the supports 32 and the lower surface of the fan housing 12 and/or the distance between the lower surface 68 of the supports 32 and the first mounting arrangement 40.

In other embodiments, the engagement between the second flange 62 of the first mounting bracket 46 and the lower surface 68 of a support 32 and between the second flange 84 of the second mounting bracket 48 and the lower surface 68 of an adjacent support 32 can orient the first mounting arrangement 40 and the fan housing 12 in a desired orientation with respect to the lower surface 68 of the supports 32 so that at least one of the first mounting arrangement 40 and the fan housing 12 extends outwardly a predetermined distance beyond the lower surface 68 of the supports 32 for engagement with a fan housing cover, a grill, or other similar structure.

In still other embodiments, the engagement between the second flange 62 of the first mounting bracket 46 and the lower surface 68 of a support 32 and between the second flange 84 of the second mounting bracket 48 and the lower surface 68 of an adjacent support 32 can orient the first mounting arrangement 40 and the fan housing 12 in a desired orientation with respect to the lower surface 68 of the supports 32 so that the lower surface 68 of the support 32 is substantially aligned with the lower surface of the first mounting arrangement 40 and/or the fan housing 12. In these embodiments, the predetermined distance 108 is substantially zero.

By positioning the first and second flanges 60, 62 of the first mounting bracket 46 and the first and second mounting flanges 82, 84 of the second mounting bracket 48 on the side and lower surfaces 68 of adjacent supports 32, the installer can also orient the first mounting arrangement 40 and the fan housing 12 to be square, true, and plumb with respect to the supports 32. The installer can support the first mounting arrangement 40 and the fan housing 12 with one hand while using his second hand to adjust the length of the first mounting arrangement 40 and to position the flanges 60, 62, 82, 84 of the first and second mounting brackets 46, 48 on the supports 32.

The installer then secures the first mounting arrangement 40 to the supports 32. In embodiments of the hanger assembly 10 having fasteners 30 pre-mounted on any of the flanges 60, 62, 82, 84 of the first and second mounting brackets 46, 48, the operator can hold the first mounting arrangement 40 and the fan housing 12 in a desired position and in a desired orientation adjacent to the supports 32 with one hand while driving the fasteners 30 into the supports 32 with a second hand.

In some embodiments, such as the illustrated embodiment of FIGS. 1-4, the fan housing 12 can be supported by two mounting arrangements 40, 42 between two or more supports 32. In these embodiments, the installer can secure the spacers 104 and the third mounting brackets 50 of both the first and second mounting arrangements 40, 42 to respective side walls 16, 18 of the fan housing 12. The installer can then connect the first and second mounting arrangements 40, 42 to the supports 32 as described above with respect to the first mounting arrangement 40.

After the first mounting assembly (and the second mounting assembly 42 in embodiments having first and second mounting arrangements 40, 42) are connected to the supports 32, the installer can secure the first, second, and third mounting brackets 46, 48, 50 of the first mounting arrangement 40 together by crimping the inwardly extending tabs 96 into engagement around the upwardly and downwardly extending rails 69, 70, 90, 92 of the first and second mounting brackets 46, 48 to reduce or prevent relative movement between the first, second, and third mounting brackets 46, 48, 50. In a similar manner, the installer can also secure the first, second, and third mounting brackets 46, 48, 50 of the second mounting arrangement 42 together to reduce or prevent relative movement between the first, second, and third mounting brackets 46, 48, 50.

Various alternatives and embodiments are contemplated as being within the scope of the following claims particularly pointing out and distinctly claiming the subject matter regarded as the invention.

What is claimed is:

1. A hanger assembly comprising:
a fan housing positioned between a first support and a second support, the first support having a lower surface; and
a body having a first end engageable with the first support and a second end engageable with the second support, the body being connectable to the fan housing to support the fan housing between the first support and the second support and being adjustable to change a length defined between the first end and the second end, the first end including an outwardly extending flange, which is engageable with the first support to orient the body and the fan housing relative to the lower surface of the first support and to maintain a predetermined distance between the lower surface of the first support and a lower surface of one of the fan housing and the hanger body, the body including
an inner surface extending between the first end and the second end, and
a spacer extending outwardly from the inner surface, the spacer being engageable with the fan housing to secure the fan housing to the hanger body and to form a separation space between the fan housing and the inner surface with the spacer extending through the separation space.

2. The hanger assembly of claim 1, wherein the body comprises
a first bracket having an inner end and an outer end;
a second bracket having an inner end and an outer end, the outer end of the first bracket at least partially defining the first end of the body and the outer end of the second bracket at least partially defining the second end of the body; and
a third bracket connectable to the fan housing and being slidingly connected to the inner end of the first bracket and the inner end of the second bracket to change the length of the hanger body.

3. The hanger assembly of claim 2, wherein the third bracket defines a channel, and wherein the inner end of the first bracket and the inner end of the second bracket are engageable with the third bracket along a length of the channel.

4. The hanger assembly of claim 1, wherein the first support includes a side surface substantially normal to the lower surface, and wherein the first end of the hanger body is engageable with the side surface of the first support to orient the hanger body and the fan housing relative to the first support.

5. The hanger assembly of claim 1, wherein the fan housing include an outwardly extending protrusion, and wherein the spacer engages the fan housing adjacent to the outwardly extending protrusion.

6. The hanger assembly of claim 1, wherein the flange supports a fastener in a retracted position, in which an outer end of the fastener is recessed with respect to the flange, and wherein the fastener is movable with respect to the flange toward an extended position, in which the fastener is engageable with the first support.

7. The hanger assembly of claim 1, wherein the support includes a side surface substantially normal to the lower surface, wherein the flange is a first flange, wherein the first end includes a second flange which is engageable with the side surface of the support.

8. A hanger assembly configured to connect to a support in a building the support having a first surface and a second surface substantially normal to the first surface, the hanger assembly comprising:
a fan housing; and
a body connectable to the fan housing and having a first flange and a second flange, the first flange being engageable with the first surface of the support and the second flange being engageable with the second surface of the support to secure the hanger body and the fan housing to the support, the body including
first bracket having an inner end and an outer end,
a second bracket having an inner end and an outer end, the outer end of the first bracket at least partially defining a first end of the body and the outer end of the second bracket at least partially defining a second end of the body, and
a third bracket connectable to the fan housing and being slidingly connected to the inner end of the first bracket and the inner end of the second bracket to change a length of the body between the first end of the body and the second end of the body, wherein the third bracket defines a channel, and wherein the inner end of the first bracket and the inner end of the second bracket are engageable with the third bracket along a length of the channel such that the inner end of the first bracket is engageable with the inner end of the second bracket at least partially within the channel.

9. The hanger assembly of claim 8, wherein the first flange is engageable with the first surface of the support to orient the body and the fan housing relative to a lower surface of the first support and to maintain a predetermined distance between the lower surface of the first support and a lower surface of one of the fan housing and the hanger body.

10. The hanger assembly of claim 8, wherein the second flange is substantially normal to the first flange.

11. The hanger assembly of claim 8, wherein the first surface of the support is a lower surface, and wherein the second flange is engageable with the lower surface of the support to orient the hanger body and the fan housing relative to the lower surface of the support.

12. The hanger assembly of claim 8, wherein the hanger body includes an inner surface and a spacer extending outwardly from the inner surface, the spacer being engageable with the fan housing to secure the fan housing to the hanger body.

13. The hanger assembly of claim 12, wherein the fan housing includes an outwardly extending protrusion, and wherein the spacer engages the fan housing adjacent to a base of the outwardly extending protrusion.

14. The hanger assembly of claim 8, wherein the first flange supports a fastener in a retracted position, in which an outer end of he fastener is recessed with respect to the first flange, and wherein the fastener is movable with respect to the first flange toward an extended position, in which the fastener is engageable with the first support.

15. The hanger assembly of claim 8, wherein the support is a first support,
wherein the building includes a second support spaced a distance from the first support, and
wherein the hanger body includes a first end engageable with the first support, a second end engageable with the second support, and is adjustable to change a length defined between the first end and the second end.

* * * * *

UNITED STATES PATENT AND TRADEMARK OFFICE
CERTIFICATE OF CORRECTION

PATENT NO. : 7,654,495 B2
APPLICATION NO. : 11/330041
DATED : February 2, 2010
INVENTOR(S) : Adrian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Twenty-third Day of November, 2010

David J. Kappos
*Director of the United States Patent and Trademark Office*